No. 754,339.

Patented March 8, 1904.

UNITED STATES PATENT OFFICE.

JOHN PARKER, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

VARIABLE-SPEED MECHANISM.

SPECIFICATION forming part of Letters Patent No. 754,339, dated March 8, 1904.

Application filed January 27, 1902. Serial No. 91,320. (No model.)

*To all whom it may concern:*

Be it known that I, JOHN PARKER, of the city and county of Providence, State of Rhode Island, have invented certain new and useful Improvements in Variable-Speed Mechanism; and I do hereby declare the following specification, taken in connection with the accompanying drawings, forming a part of the same, to be a full, clear, and exact description thereof.

The invention relates to mechanism for effecting variations in speed and may be employed in various machines wherein it may be desired to vary the speed or relative movement of the parts when using the machine under varying conditions.

In a mechanism embodying the invention motion is imparted to the mechanism to be operated through two rotary members so arranged and connected that either member may be driven from the other, the member which is driven being connected with the mechanism to be operated and the speed being changed by transforming the driving member into a driven member. By making one of the rotary members in the form of a cone-gear and the other in the form of a gear which may be geared to any one of the gears of the cone-gear a wide variation in the speeds of the mechanism to be operated may be obtained with gears of comparatively small diameters and a large number of different speeds may be obtained with a comparatively small number of gears. In embodying this form of the invention in a simple mechanism certain minor features of invention may be employed which are not essential to the broad features, but are advantageous in that they contribute to a compact and highly-efficient mechanism. Certain of these features relate to the means employed for transforming the cone-gear from a driving member to a driven member, and vice versa, and certain other features relate to the means employed for connecting the cone-gear with the gear which forms the other rotary member.

In the accompanying drawings a mechanism is shown which embodies all the features of the invention in a simple and efficient form.

Figure 1:
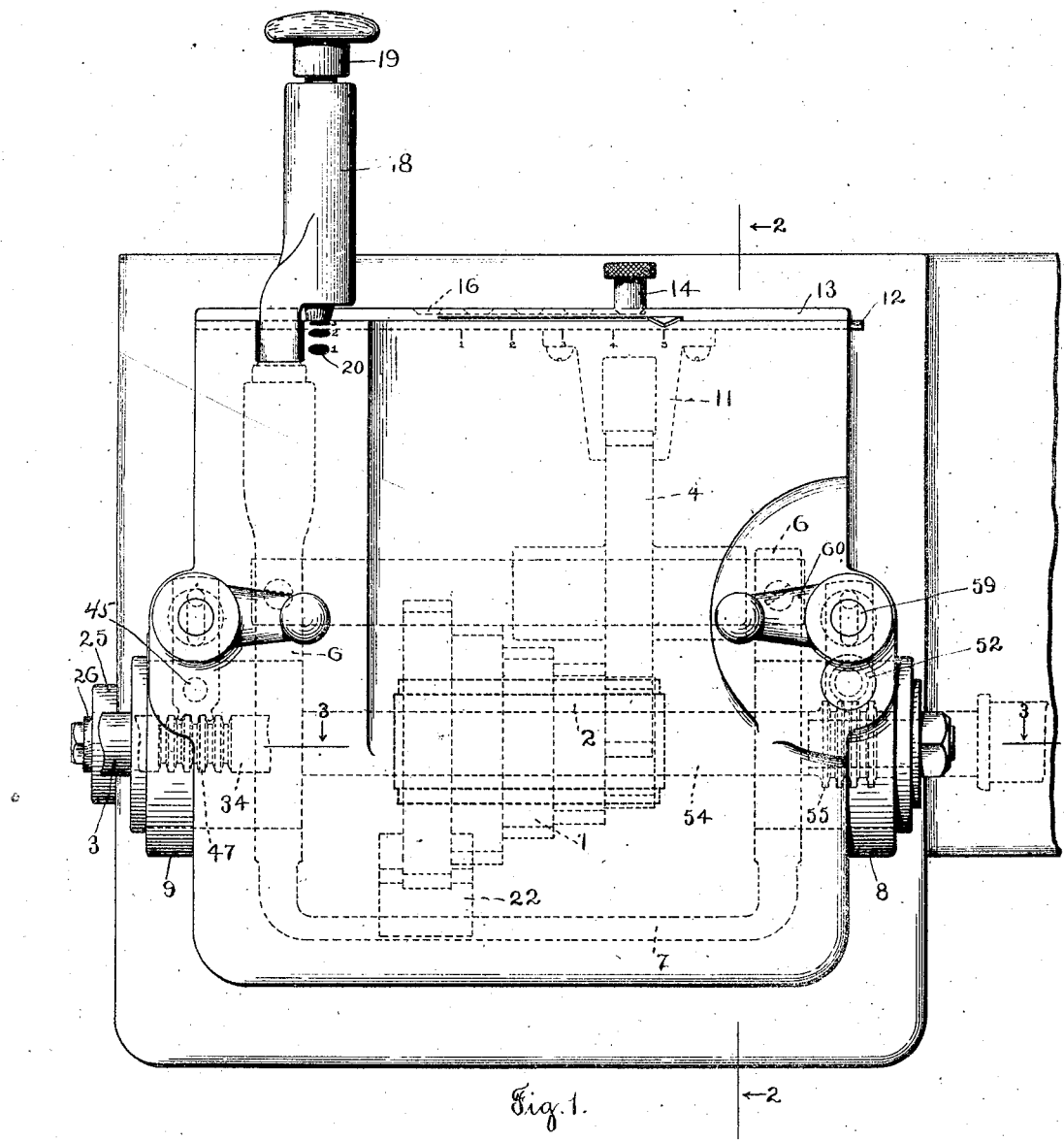
Figure 2:
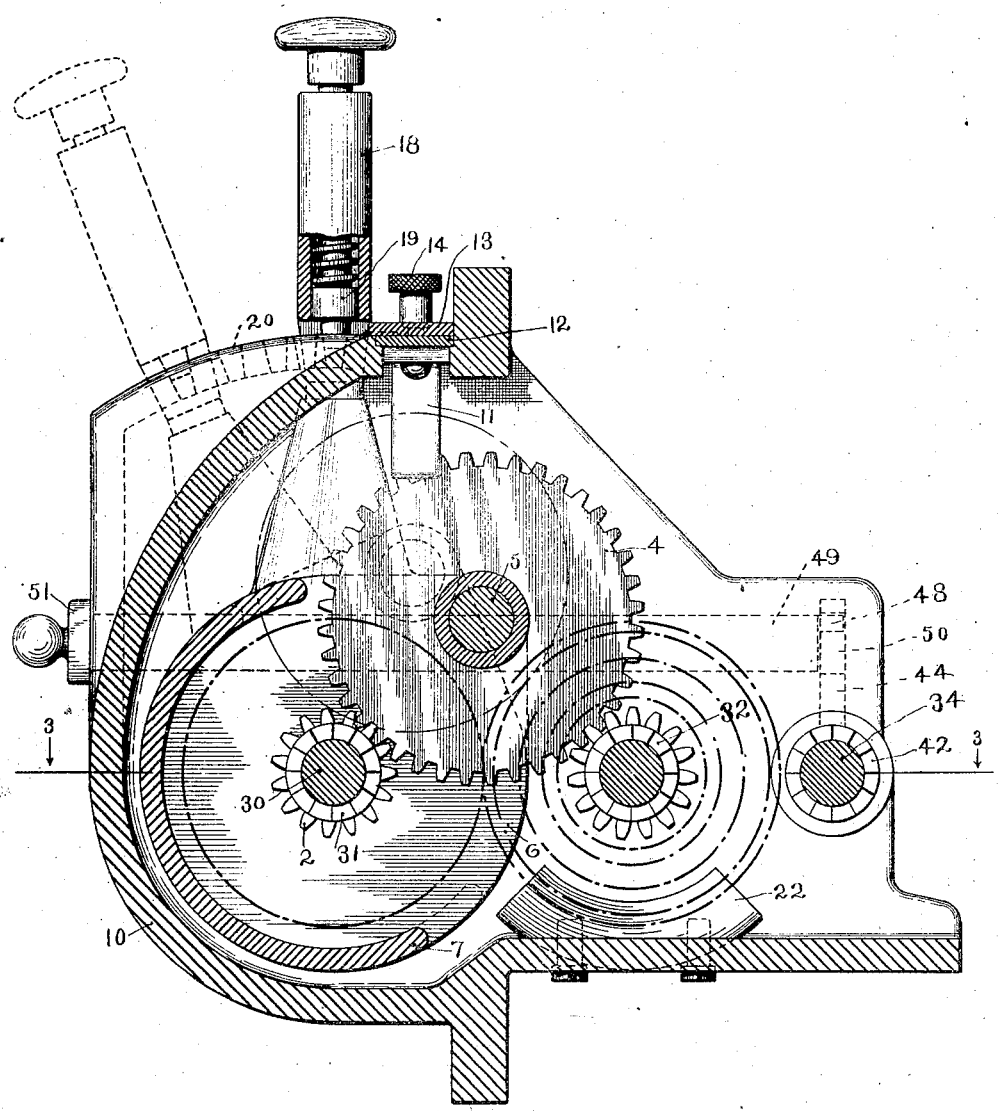
Figure 3:
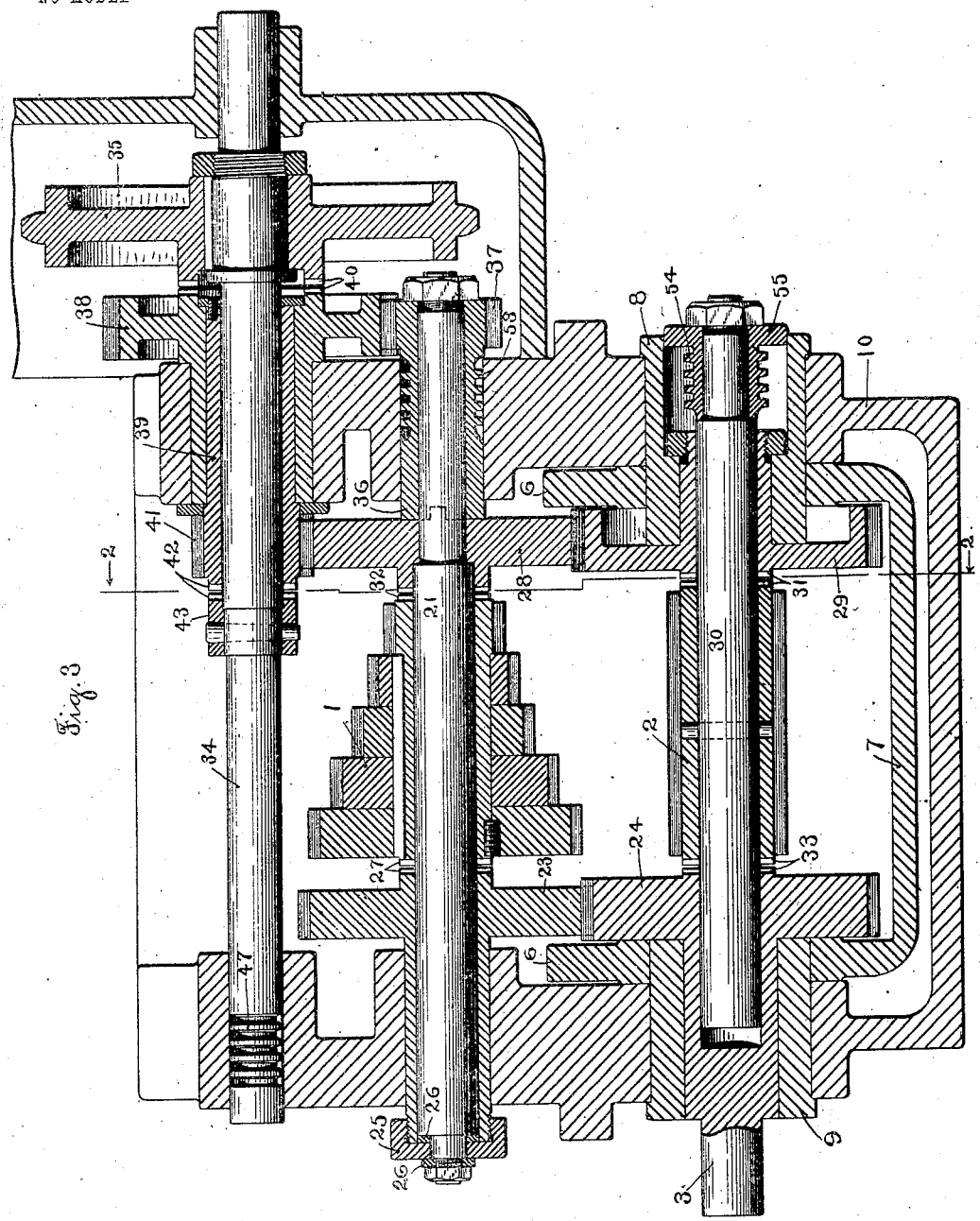
Figure 4:
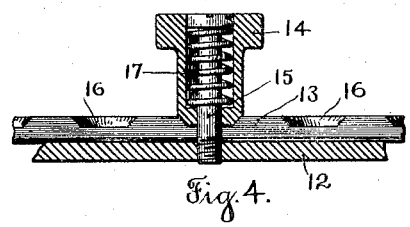
Figure 5:
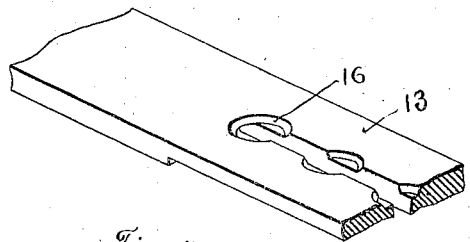
Figure 6:
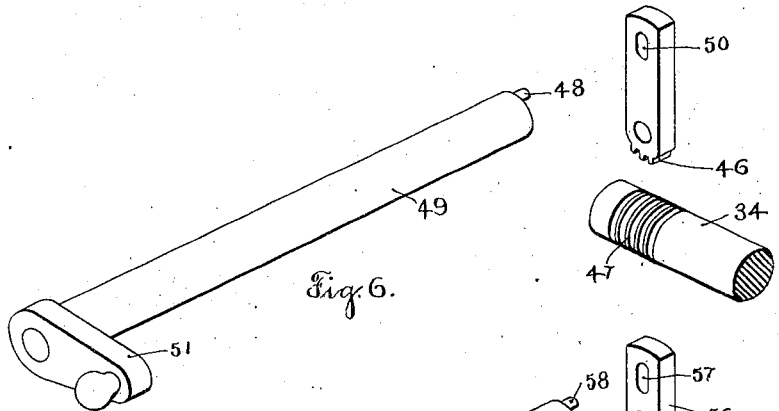
Figures 7, 8:
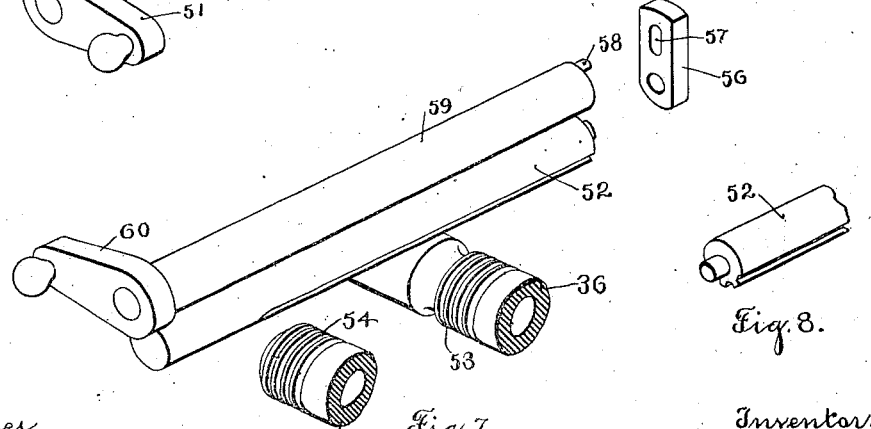

In the drawings, Figure 1 is a front elevation. Fig. 2 is a sectional view on line 2 2 of Fig. 1. Fig. 3 is a sectional view on line 3 3 of Fig. 2, and Figs. 4 to 8 are details of devices to be described.

In the mechanism shown the two rotary members, either of which may be driven from the other, consist of a cone-gear 1 and a gear 2, and that gear which is driven from the other is connected with a shaft 3, which may be connected with the other parts of the mechanism to be operated at different speeds through any suitable connecting devices. The two gears 1 and 2 are connected through an intermediate gear 4, which meshes with the gear 2 and is so mounted that it may be brought into mesh with any one of the gears of the cone-gear. To enable the gear 4 to be thus adjusted, it is loosely mounted upon a shaft 5, the ends of which are secured in the arms 6 of a frame 7. This frame is supported to turn upon bushings 8 and 9, secured in the ends of the casing 10 and concentric with the gear 2, so that the gear 4 will remain in mesh with gear 2 as the frame is swung about the axis of the gear. The lateral position of the gear 4 on the shaft 5 is determined by a shoe 11, secured to a slide 12 and having arms which engage opposite sides of the gear. The slide 12 is guided in the casing 10 and is held in its guides by a plate 13. The slide and shoe are adjusted to move the gear 4 laterally by means of a handle 14, mounted upon a pin 15, Fig. 4, which is secured to the slide and projects up through a slot in the plate 13. The gear is held in adjusted position by the engagement of the handle 14 with one of a series of recesses 16, corresponding to the gears of the cone-gear, the handle being yieldingly held in engagement with the recess by a spring 17. By swinging the frame 7 about its support and moving the gear 4 laterally the gear may be brought into mesh with any one of the gears of the cone-gear.

The frame 7 is adjusted about its axis by means of a handle 18, extending from one of the arms of the frame through a slot in the casing 10, and the frame is held in any one of its adjusted positions by a spring-pressed pin 19, mounted in the handle and arranged to engage any one of a series of recesses 20, which correspond to the positions of the frame required to bring the gear 4 into mesh with the various gears of the cone-gear.

The cone-gear is loosely mounted on a shaft 21 and is held from lateral movement by a shoe 22, secured to the casing 10 and engaging the opposite sides of the largest gear of the cone-gear, Figs. 1 and 2. When the cone-gear is the driven member, it is connected with the shaft 3 through a gear 23, which meshes with a gear 24, fast on the shaft 3. The gear 23 it mounted in the casing 10 and forms a bearing for one end of the shaft 21, about which it is free to revolve. The gear is connected to move longitudinally with the shaft by means of a collar 25, secured to the hub of the gear and having a flange fitting between collars 26 on the end of the shaft. The cone-gear and gear 23 are connected and disconnected through clutch-faces 27 on the gears, arranged to be engaged or disengaged by longitudinal movement of the shaft 21. When the cone-gear is the driven member, the gear 2 is the driving member, and at this time the gear 2 is driven through a gear 28, secured to the shaft 21 and engaging a gear 29, which is mounted in the bushing 8. The gear 29 forms the bearing for one end of the shaft 30, to which gear 2 is secured, and the gears 29 and 2 may be connected or disconnected by means of clutch-faces 31, formed on the gears and arranged to be engaged or disengaged by a longitudinal movement of the shaft 30.

When clutches 27 and 31 are in engagement, motion is transmitted from gear 2 through gear 1 to the shaft 3, and presuming the speed of gear 2 to be constant the shaft 3 may be given as many different speeds as there are gears in the cone-gear, being five in the mechanism shown, the changes in speed being effected by adjustment of the intermediate gear.

The number of vibrations in speed may be doubled by transforming the cone-gear into a driving member and the gear 2 into a driven member—that is, by reversing the relation of the two gears. This is done by disconnecting the gear 1 from the shaft 3 and connecting it with the driving-gear 28 and disconnecting gear 2 from the driving-gear and connecting it with shaft 3. The means for connecting the gear 1 with the driving-gear 28 consists of clutch-faces 32, formed on the gears and arranged to be engaged and disengaged by the longitudinal movement of shaft 21. The means for connecting the gear 2 with the shaft 3 consists of clutch-faces 33, formed on said gear and shaft and arranged to be engaged or disengaged by longitudinal movements of the shaft 30.

When clutches 33 and 32 are engaged, motion is transmitted from gear 1 through gear 2 to the shaft 3, and presuming the speed of gear 1 to be constant the shaft 3 may be given as many different speeds as there are gears in the cone-gear—five in the mechanism shown. These five speeds will be different from the five speeds obtainable when the cone-gear is the driven member, so that ten different speeds may be obtained with but five gears in the cone-gear.

When the gear 2 is the driver and it is connected with the largest gear in the cone-gear, the shaft 3 is driven at a comparatively slow speed, while with the same gears connected and the cone-gear the driver the shaft 3 is driven at a comparatively high speed. Thus the reversing of the relations of the two connected gears, so that motion may be transmitted from either one to the other, enables a wide variation in the speed of shaft 3 with the use of gears of comparatively small diameters. This result is not dependent upon the presence in the mechanism of means for varying the relative speeds of the two gears; but in case but two speeds for the shaft 3 are desired the relative speeds of the two gears forming the rotary members may remain the same. In such case the change from one speed to the other would be effected by transforming the gears from driver to driven, and vice versa.

The number of variations in the speed of shaft 3 may be increased by providing means for varying the speed of the gear 28, and in the mechanism shown this gear may be driven at either of two speeds. The gear 28 is driven from a driving-shaft 34, upon which is secured a sprocket-wheel 35, to which power may be applied. The gear 28 is connected with a sleeve 36, secured to the shaft 21 and carrying a gear 37, which meshes with a gear 38. The gear 38 is mounted in the casing 10 and surrounds a sleeve 39, which in turn surrounds the shaft 34. The gear 38 is free to turn with relation to the sleeve 39 and may be connected with the shaft 34 by means of clutch-faces 40, formed on the gear and on sprocket-wheel 35 and arranged to be engaged or disengaged by a longitudinal movement of the shaft. A gear 41 is formed on sleeve 39 and meshes with gear 28. The gear 41 may be connected with the shaft 34 by means of clutch-faces 42, formed on the sleeve 39 and on a collar 43, secured to the shaft and arranged to be engaged or disengaged by longitudinal movement of the shaft 34.

When clutch 40 is engaged, clutch 42 is disengaged and gear 28 is driven through gears 38 and 37. By shifting the shaft 34 the clutch 40 may be disengaged and clutch 42 engaged, when gear 28 will be driven by gear 41 at a different speed.

The devices employed for shifting the shaft 34 consist of a lever 44, pivoted at 45 and provided with teeth 46 at one end for engaging a series of annular teeth 47 on the end of shaft 34. The lever is swung in one direction or the other to shift the shaft by means of a crank-pin 48, formed on the end of a shaft 49 and engaging a slot 50 in the lever. The shaft is rocked in one direction or the other by a handle 51, secured to its outer end.

The shafts 21 and 30 are moved longitudinally by means of a rock-shaft 52, journaled in the casing and provided with gear-teeth arranged to engage annular gear-teeth 53, formed on the sleeve 36, and similar teeth 54, formed on a sleeve 55, secured to shaft 30. An arm 56 is secured to the rear end of the rock-shaft 52 and is provided with a slot 57, in which works a crank-pin 58, formed on the end of a shaft 59. A handle 60 is secured to the front end of shaft 59, by which the shaft may be turned to turn rock-shaft 52 in either direction. When the handle 60 is in the position shown, none of the clutches 27, 31, 32, and 33 are in engagement. If the handle is moved downward, the shafts 21 and 30 will be moved to the right, thus engaging clutches 27 and 31, in which case motion will be transmitted to the shaft 3 from gear 2 through gear 1, while if the handle is moved upward the shafts will be moved to the left, engaging clutches 32 and 33, in which case motion will be transmitted from the gear 1 to shaft 3 through gear 2.

What I claim as my invention, and desire to secure by Letters Patent, is—

1. A variable-speed mechanism comprising two rotary members mounted to rotate about fixed axes, and means for transmitting motion from either rotary member through the other to the mechanism to be operated, substantially as described.

2. A variable-speed mechanism comprising two rotary members, means for transmitting motion from either rotary member through the other to the mechanism to be operated, and means for varying the relative speeds of the two members, substantially as described.

3. A variable-speed mechanism comprising two gears mounted to rotate about fixed axes and so connected that the motion of one is transmitted to the other, means for reversing the relation of said gears as driver and driven, and means for connecting either of said gears to the mechanism to be operated, substantially as described.

4. A variable-speed mechanism comprising a cone-gear and a second gear, means for connecting any one of the gears of the cone-gear with the second gear, means for connecting either the cone-gear or second gear to the mechanism to be operated, and means for reversing the relation of said gears as driver and driven, substantially as described.

5. A variable-speed mechanism comprising two gears so connected that the motion of one is transmitted to the other, a driver, means for connecting either of said gears with the driver without changing the position of said driver, and means for connecting either of said gears with the mechanism to be operated, substantially as described.

6. A variable-speed mechanism comprising a cone-gear and a second gear, means for connecting any one of the gears of the cone-gear with the second gear, a driver, means for connecting either the cone-gear or the second gear with the driver, and means for connecting either the cone-gear or the second gear with the mechanism to be operated, substantially as described.

7. A variable-speed mechanism comprising two gears mounted to rotate about fixed axes and so connected that motion is transmitted from one to the other, mechanism for driving either of said gears, clutches for connecting and disconnecting each of said gears with the driving mechanism, mechanism operated from said gears, and clutches for connecting and disconnecting each of said gears with said driving mechanism, substantially as described.

8. A variable-speed mechanism comprising a cone-gear 1, a gear 2, an adjustable intermediate gear 4, for connecting any one of the gears of cone-gear 1 with gear 4, a shaft 3, gear 24 secured thereto, gear 23 meshing with gear 24, clutches 27 and 33, gears 28 and 29, clutches 32 and 31, and means for engaging either clutches 27 and 31 or clutches 32 and 33, substantially as described.

9. The combination of two rotary members, means for transmitting motion from one member to the other, two connected driving members, two connected driven members, coupling and uncoupling devices between one rotary member and one driving and one driven member, similar devices between the other rotary member and the other driving and driven members, substantially as described.

JOHN PARKER.

Witnesses:
W. H. THURSTON,
J. H. THURSTON.